(12) United States Patent
Sechrist et al.

(10) Patent No.: US 8,283,509 B2
(45) Date of Patent: Oct. 9, 2012

(54) THERMAL-SEPARATION PROCESS WITH ABSORPTION HEAT PUMP

(75) Inventors: Paul A. Sechrist, South Barrington, IL (US); Stanley J. Frey, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 491 days.

(21) Appl. No.: 12/630,195

(22) Filed: Dec. 3, 2009

(65) Prior Publication Data

US 2011/0132741 A1    Jun. 9, 2011

(51) Int. Cl.
*C07C 7/04* (2006.01)

(52) U.S. Cl. ............. 585/802; 585/809; 203/75; 203/84

(58) Field of Classification Search .................. None
See application file for complete search history.

(56) References Cited

U.S. PATENT DOCUMENTS

| | | | |
|---|---|---|---|
| 4,374,022 A * | 2/1983 | Fuderer | 208/310 Z |
| 5,332,546 A | 7/1994 | Le Goff et al. | |
| 6,247,331 B1 | 6/2001 | Nishiguchi et al. | |
| 8,067,646 B2 * | 11/2011 | Wegerer et al. | 568/916 |

OTHER PUBLICATIONS

Le Goff, Pierre, et al.; Exergy Analysis of Distillation Processes; Chem. Eng. Technol. (1996) p. 478-485.
Le Goff, P., et al.; Diabatic Distillation: Simulation-Optimisation of a Column with Integrated Heat Exchangers, ICHEME Symp. Series, v1, No. 128, 1992, p. A77-A90.
Le Goff, P., et al.; the Concept of 'Reverse-Fractional-Distillation' Exergy Analysis and Applications, ICHEME Symposium Series v2, No. 128, 1992, p. B55-B67.
Ranger, P-M., et al.; Modelling of a New Type of Absorption Heat Pump Combining Rectification and "Reverse-Rectification", J. Chem Eng of Japan, vol. 23, No. 5, 1990, p. 530-536.
Ranger, P-M., et al.; Modelling and Experimental Operation of a "Reverse-Rectification Column" for an Absorption Heat Pump, J.Chem Eng of Japan, vol. 23, No. 5, 1990, p. 537-542.

* cited by examiner

*Primary Examiner* — Tam M Nguyen
(74) *Attorney, Agent, or Firm* — Mark R Willis

(57) ABSTRACT

The invention comprises an absorption heat pump to supply energy to a distillation process or an outside process. The streams used to effect the absorption heat pump are to be combined in any case as a feedstream to a conversion process, and energy thus is conserved by avoiding the necessity of reseparating the streams.

20 Claims, 1 Drawing Sheet

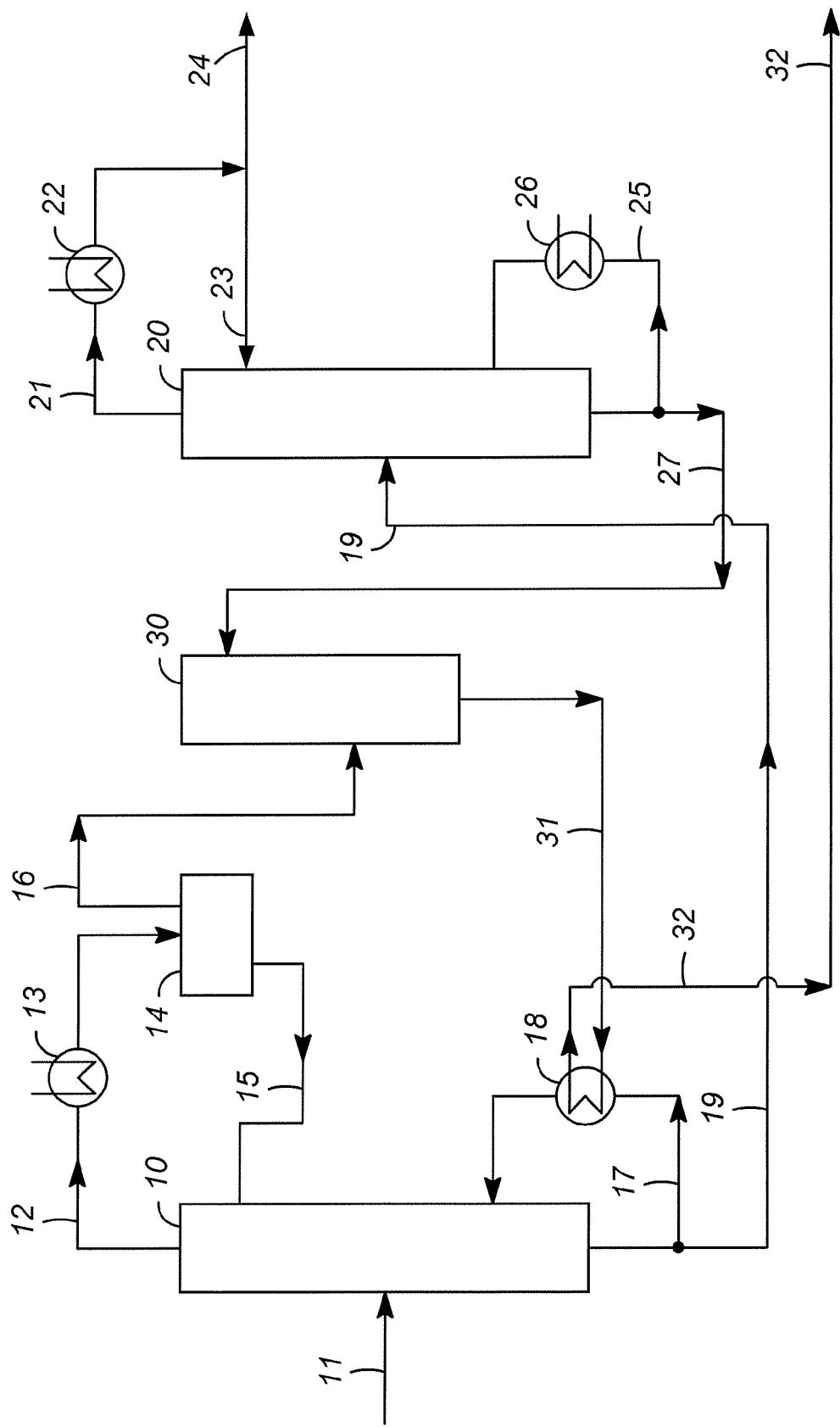

THERMAL-SEPARATION PROCESS WITH ABSORPTION HEAT PUMP

FIELD OF THE INVENTION

This invention relates to thermal-separation processes such as fractional distillation. More specifically, the invention relates to energy-saving provisions in fractional distillation incorporating an absorption heat pump.

BACKGROUND OF THE INVENTION

The invention provides a process and apparatus to upgrade low-temperature energy recovered in thermal-separation processes to high-temperature energy which can be reused in the separation. It is known that fluid pairs can be used to upgrade energy quality through absorption. Ordinarily, this is accomplished in a closed-loop system wherein a lower-boiling component is fractionated from a higher-boiling component, vaporized around the distillation temperature of the higher-boiling component, and recontacted in a higher-pressure absorber to generate heat at a higher temperature which is used in the distillation process. This process also has been disclosed for an open-loop system using components which are the subject of the separation process, but the recombination during absorption requires recycle of the absorbed components to separation with resulting inefficiencies.

SUMMARY OF THE INVENTION

A broad embodiment of the invention is a separation process comprising an absorption heat pump by dividing a feedstream into at least one lower-boiling vapor stream, at least one intermediate product, and at least one higher-boiling liquid stream and recombining at least one each of the lower-boiling and higher-boiling streams to obtain an enhanced heat source and feedstock to a conversion-process, comprising absorbing the at least one lower-boiling vapor stream in at least one higher-boiling liquid stream to obtain an enhanced heat source to effect separation of the feedstream; supplying heat to the separation process from the enhanced heat source thus deriving a conversion-process feedstock from the heat source; and processing the feedstock without further separation in a conversion process.

A more specific embodiment is a distillation process comprising an absorption heat pump by dividing a feedstream into at least one lower-boiling vapor stream, at least one intermediate product, and at least one higher-boiling liquid stream and recombining at least one each of the lower-boiling and higher-boiling streams to obtain an enhanced heat source and feedstock to a conversion-process, comprising absorbing the at least one lower-boiling vapor stream in at least one higher-boiling liquid stream to obtain an enhanced heat source to effect separation of the feedstream; supplying heat to the separation process from the enhanced heat source thus deriving a conversion-process feedstock from the heat source; and processing the feedstock without further separation in a conversion process.

A yet more specific embodiment is a distillation process comprising an absorption heat pump by dividing a feedstream into a lower-boiling liquid stream, an intermediate product, and a higher-boiling liquid stream and recombining the lower-boiling and higher-boiling streams to obtain an enhanced heat source and feedstock to a conversion-process, comprising vaporizing the lower-boiling liquid stream using a low-temperature fluid to obtain a lower-boiling vapor stream; absorbing the lower-boiling vapor stream in the higher-boiling liquid stream to obtain an enhanced heat source to effect separation of the feedstream; supplying heat to the separation process from the enhanced heat source thus deriving a conversion-process feedstock from the heat source; and processing the feedstock without further separation in a conversion process.

BRIEF DESCRIPTION OF THE DRAWING

The FIGURE is a simplified flowsheet of a fractional distillation process which has been augmented with an absorption heat pump to recover and recycle energy.

DETAILED DESCRIPTION OF THE INVENTION

The present invention is particularly useful in conversion processes in which a product is recovered by distillation as an intermediate stream and lighter and heavier streams are recycled to the conversion process. One example of this is a transalkylation process to produce $C_8$ aromatics, with toluene and lighter and $C_9$ and heavier aromatics being separated by fractionation from the product and recycled to the transalkylation step. Another example is a metathesis process to produce propylene, with ethylene and butenes and heavier olefins being separated from the product and recycled to metathesis. These examples of process applications are only illustrative of the many possible lighter and heavier streams that could be combined according to the present invention as recycle to a conversion process. Energy for the separation step can be upgraded according to the present invention by combining the lighter and heavier recycle materials prior to recycle.

The invention comprises a thermally activated separation process in which at least part of the higher-temperature input heat to effect the separation is provided by recovery and recycle of at least part of the lower-temperature heat rejected from the process. The recovery and recycle is accomplished by an absorption heat pump, in which a vaporized lower-boiling stream is absorbed into a higher-boiling stream thereby releasing heat and thereby raising the temperature of the combined liquid for use in effecting the separation. In the present process, at least a portion of each of the lower-boiling stream and higher-boiling stream are sent in combination to a conversion process and thus do not need to be separated for use in the absorption heat pump. The heat released in the absorption step is provided as input heat to the separation process or to another energy-absorbing process via indirect heat exchange.

One embodiment of the invention comprising an absorption heat pump is illustrated in the FIGURE. The principal equipment items are a distillation column 10 to separate a lower-boiling vapor stream, a distillation column 20 to separate an intermediate product from a higher-boiling stream, and an absorber 30 to provide an enhanced heat source by combining the vapor and liquid streams. The distillation column 10 processes a feedstream 11 to send a vapor stream 12 overhead through condenser 13 into a vessel 14, from which reflux 15 is returned to column 10. A net lower-boiling stream 16 may be taken as a vapor, implied in the drawing, or as a liquid which subsequently is vaporized to provide a lower-boiling vapor stream; the liquid preferably would be pumped to a higher pressure to provide a higher-temperature enhanced heat source. Column 10 is reboiled by returning a bottoms stream 17 through reboiler 18 to the column; stream 19 is a net bottoms stream.

Stream 19 passes to column 20, which sends a vapor stream 21 overhead to condenser 22, producing reflux stream 23 and a net intermediate product 24; the latter usually is considered to be the net product from the process. Column 20 is reboiled by returning a bottoms stream 25 through reboiler 26 to the column. Stream 19 is a net higher-boiling liquid stream as defined in the process.

The absorption heat pump is effected by combining the lower-boiling vapor stream 16 with the higher-boiling liquid stream 27. This usually is effected by absorbing the vapor stream into the liquid stream in an absorber 30, operating at sufficient pressure to yield a liquid stream 31 as an enhanced heat source. This enhanced heat source is enhanced in temperature as a result of the heat of absorption of vapor stream 16 into liquid stream 27, and can be used in any one of a number of ways, such as reboiling column 10 as shown or in heating or reboiling duties in other associated processes. Efficiency could be improved by combining the functions of absorber 30 and reboiler 18; e.g., the reboiler could be located as an interstage cooler or plate exchanger in the absorber column.

The combined stream 31, after being used as an enhanced heat source, becomes a feedstock 32 to a conversion process such as, without limiting the present invention, transalkylation, disproportionation, reforming, or cracking. It is a feature of the present process that this combined stream does not have to be separated in order to provide an absorption heat pump. That is, use of the absorption heat pump in the disclosed manner inherently makes it possible to reduce net energy requirements of a distillation process without having to separate the components used in the absorption cycle. This open-loop scheme thus has a higher coefficient of performance ("COP"), defined as the net heat output divided by heat input at a lower temperature than a closed-loop scheme associated with the same separation.

Further, the energy recovery achievable with all embodiments can be further increased beyond that possible with a single stage generator by incorporating a multi-effect or multistaged generator. Multiple effect absorption systems are disclosed such references as U.S. Pat. No. 3,710,852; U.S. Pat. No. 4,085,596; and U.S. Pat. No. 4,183,228, incorporated herein by reference thereto.

Although FIG. 1 reflects a very simple fractional distillation apparatus for ease of explanation, the absorption-heat-pump augmentation applies equally to more complex arrangements. There may be multiple columns, multiple reboilers, and/or multiple reflux condensers. A single absorption heat pump can serve multiple heat sources and sinks with a single circulating absorbent solution by providing a separate absorber for each temperature level. Other heat recovery techniques may be present, e.g. multiple effect distillation or compressor driven heat pumps, and absorption heat pump can advantageously be incorporated to provide even further recovery. The reboiler and/or reflux condenser can be built into the column, even including interboilers and intercondensers.

Typical thermally activated separation processes involving gas purification, including the locations where heat is supplied and rejected, are described in standard chemical engineering references such as "Gas Purification" third edition by A. Kohl and F. Riesenfeld, Gulf Publishing Co., Houston Tex., 1979.

It must be emphasized that the above description is merely illustrative of a preferred embodiment, and is not intended as an undue limitation on the generally broad scope of the invention. Moreover, while the description is narrow in scope, one skilled in the art will understand how to extrapolate to the broader scope of the invention. For example, the procedure for the simultaneous control of more than one characteristic can be readily extrapolated from the foregoing description. Similarly, one skilled in the art would understand how both the step time and the flow rates of the streams might be adjusted.

The invention claimed is:

1. A separation process comprising an absorption heat pump by dividing a feedstream into at least one lower-boiling vapor stream, at least one intermediate product, and at least one higher-boiling liquid stream and recombining at least one each of the lower-boiling and higher-boiling streams to obtain an enhanced heat source and feedstock to a conversion-process, comprising:
   a. absorbing the at least one lower-boiling vapor stream in at least one higher-boiling liquid stream to obtain an enhanced heat source;
   b. supplying heat to an energy-absorbing process from the enhanced heat source thus deriving a conversion-process feedstock from the heat source; and,
   c. processing the feedstock without further separation in a conversion process.

2. The process of claim 1 wherein the energy-absorbing process of step (b) is the separation process.

3. The process of claim 1 further comprising vaporizing at least one lower-boiling liquid stream from the separation process using a low-temperature fluid to obtain the at least one lower-boiling vapor stream.

4. The process of claim 3 wherein the low-temperature fluid is a waste-heat stream.

5. The process of claim 4 wherein the waste-heat stream is low-temperature steam.

6. The process of claim 1 wherein the separation process is a distillation process in which the at least one lower-boiling vapor stream is distillate from distillation and the at least one higher-boiling liquid stream is a bottoms stream from distillation.

7. The process of claim 1 wherein the conversion process comprises one or both of transalkylation and disproportionation.

8. A distillation process comprising an absorption heat pump by dividing a feedstream into at least one lower-boiling vapor stream, at least one intermediate product, and at least one higher-boiling liquid stream and recombining at least one each of the lower-boiling and higher-boiling streams to obtain an enhanced heat source and feedstock to a conversion-process, comprising:
   a. absorbing the at least one lower-boiling vapor stream in at least one higher-boiling liquid stream to obtain an enhanced heat source to effect separation of the feedstream;
   b. supplying heat to the separation process from the enhanced heat source thus deriving a conversion-process feedstock from the heat source; and,
   c. processing the feedstock without further separation in a conversion process.

9. The process of claim 8 further comprising vaporizing at least one lower-boiling liquid stream from the distillation process using a low-temperature fluid to obtain the at least one lower-boiling vapor stream.

10. The process of claim 9 wherein the low-temperature fluid is a waste-heat stream.

11. The process of claim 10 wherein the waste-heat stream is low-temperature steam.

12. The process of claim 8 wherein the conversion process comprises one or both of transalkylation and disproportionation.

13. The process of claim 8 wherein the lower-boiling stream comprises toluene, the intermediate product comprises C$_8$ aromatics, the higher-boiling stream comprises C$_9$ aromatics, and the conversion process comprises transalkylation.

14. The process of claim 8 wherein the lower-boiling stream comprises ethylene, the intermediate product comprises propylene, the higher-boiling stream comprises butenes, and the conversion process comprises metathesis.

15. A distillation process comprising an absorption heat pump by dividing a feedstream into a lower-boiling liquid stream, an intermediate product, and a higher-boiling liquid stream and recombining the lower-boiling and higher-boiling streams to obtain an enhanced heat source and feedstock to a conversion-process, comprising:
   a. vaporizing the lower-boiling liquid stream using a low-temperature fluid to obtain a lower-boiling vapor stream;
   b. absorbing the lower-boiling vapor stream in the higher-boiling liquid stream to obtain an enhanced heat source to effect separation of the feedstream;
   c. supplying heat to the separation process from the enhanced heat source thus deriving a conversion-process feedstock from the heat source; and,
   d. processing the feedstock without further separation in a conversion process.

16. The process of claim 15 wherein the low-temperature fluid is a waste-heat stream.

17. The process of claim 16 wherein the waste-heat stream is low-temperature steam.

18. The process of claim 15 wherein the conversion process comprises one or both of transalkylation and disproportionation.

19. The process of claim 15 wherein the lower-boiling stream comprises toluene, the intermediate product comprises C$_8$ aromatics, the higher-boiling stream comprises C$_9$ aromatics, and the conversion process comprises transalkylation.

20. The process of claim 15 wherein the lower-boiling stream comprises ethylene, the intermediate product comprises propylene, the higher-boiling stream comprises butenes, and the conversion process comprises metathesis.

* * * * *